May 14, 1935.   L. H. VON OHLSEN   2,001,557
ELECTRIC REGULATION
Filed April 19, 1933
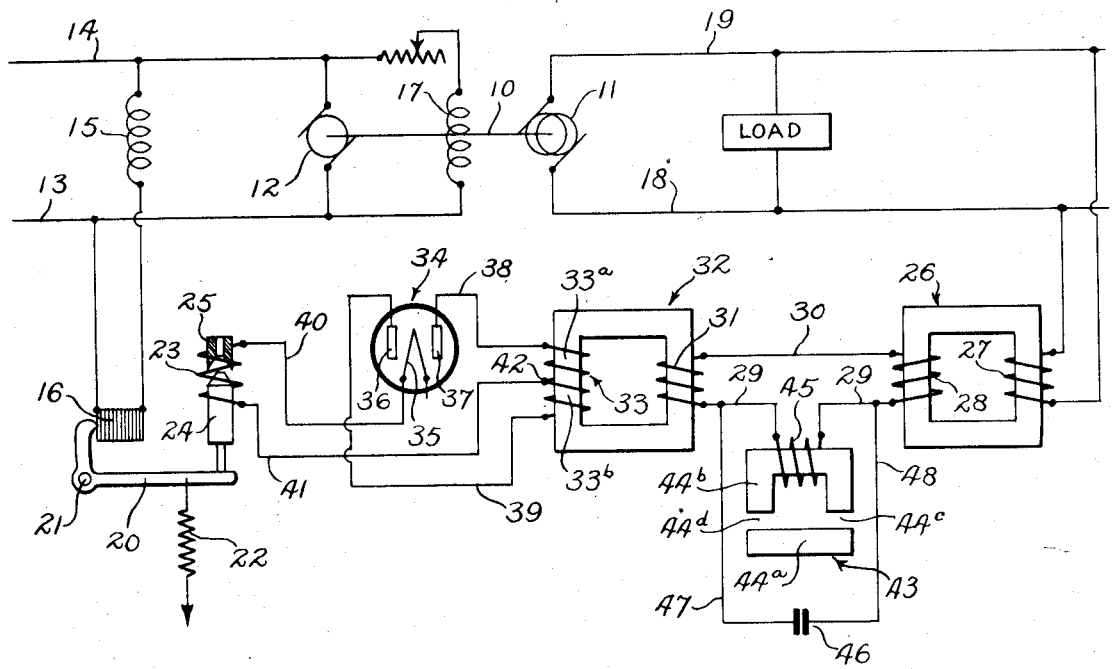
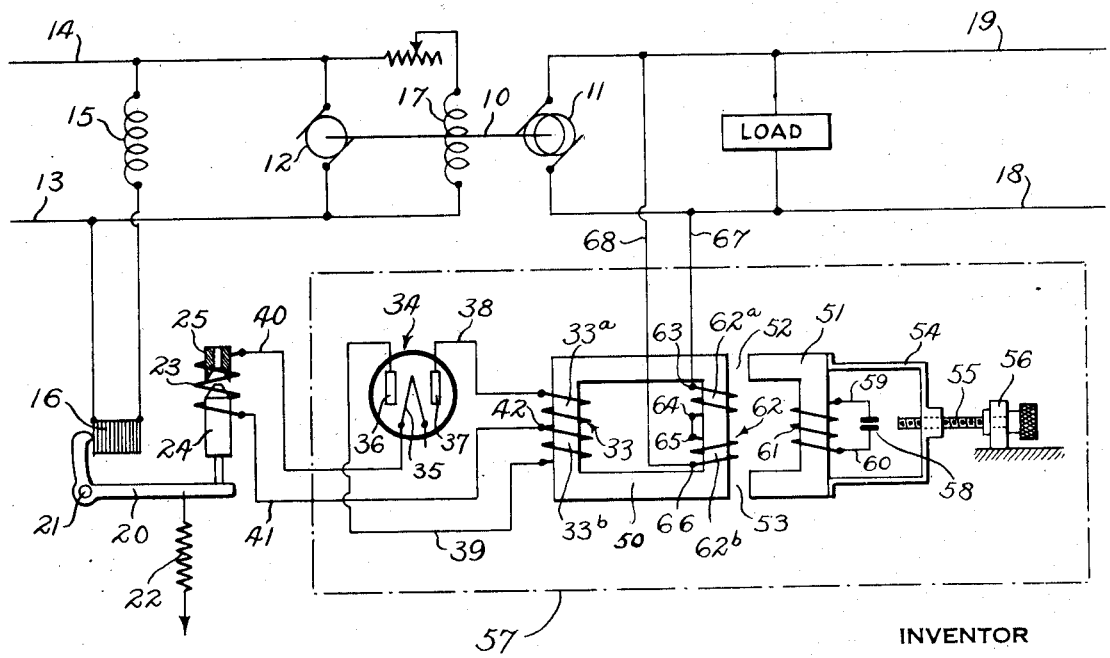
INVENTOR
Louis H. Von Ohlsen
BY
Janney, Blair & Curtis
ATTORNEYS Patented May 14, 1935

2,001,557

UNITED STATES PATENT OFFICE 2,001,557

ELECTRIC REGULATION

Louis H. Von Ohlsen, New Haven, Conn., assignor to The Safety Car Heating & Lighting Company, a corporation of New Jersey Application April 19, 1933, Serial No. 666,812

21 Claims. (Cl. 171—119)

This invention relates to electric regulation and more particularly to frequency regulation of alternating current circuits or speed regulation. One of the objects of this invention is to provide a simple, practical, and inexpensive system and apparatus for achieving frequency or speed control or regulation. Another object is to provide a system and apparatus of the above-mentioned character in which reliable action with minimum apparatus and minimum of labor of installation may be successfully and inexpensively achieved. Another object is to provide a system and apparatus of the above-mentioned nature in which first cost of equipment and maintenance costs may be reliably diminished, in which compactness of arrangement and construction are achieved inexpensively and without sacrifice of dependability and accuracy of action, and in which simplicity of manufacture and ease of installation are readily achieved. Another object is to provide a system and apparatus of the above-mentioned character that will be well adapted to meet the varying conditions of wide practical use. Other objects will be in part obvious or in part pointed out hereinafter.

The invention accordingly consists in the features of construction, combination of elements, and arrangements of parts as will be exemplified in the structure to be hereinafter described and the scope of the application of which will be indicated in the following claims.

In the accompanying drawing, in which are shown several of various possible embodiments of the mechanical and electrical features of my invention, Figure 1 is a diagrammatic representation of a speed or frequency regulating system and apparatus embodying certain features of my invention, and Figure 2 is a similar diagrammatic representation of a preferred form of my invention.

Similar reference characters refer to similar parts throughout the several views in the drawing.

As conducive to a clearer understanding of certain features of my invention, it might here be noted that many occasions arise in practice for achieving constancy of speed of rotation of a driven or driving member or for achieving constancy of frequency in an alternating current circuit or system; in the latter case the frequency is generally a function of the speed of rotation of an alternator and in the former case, according to certain features of my invention, I provide an alternator driven by the driven or driving member in order that the speed of rotation of the latter may in turn determine the frequency of the alternating current output of the driven alternator. Departures from the intended frequency, corresponding to departures from the intended speed of rotation, I thereupon utilize to correct such departures and restore the frequency and hence the speed to normal or intended value.

Turning now to Figure 1, let the shaft 10 represent the member whose speed of rotation is to be regulated in which case the alternator 11, driven by the shaft 10, represents the pilot alternator whose frequency is to be a function of the speed of rotation of the shaft 10, or the alternator 11 might be considered to be the alternator of any power or other alternating current circuit, the frequency of which is to be controlled or regulated. Alternator 11 and its shaft 10 may be driven by any suitable driving or motive means provided with any suitable speed controlling means, and by way of illustration I have shown such motive means in the form of a direct current motor 12 deriving electrical energy from any suitable direct current circuit 13—14; motor 12 is provided with a suitable exciting field 15 whose flux, among other things, determines the speed of rotation of the armature of the motor. A variable resistance, preferably taking the form of a compressible carbon pile 16 is included in the circuit of the shunt field winding 15 in order thereby to vary the exciting current and hence the flux. It is to be understood, however, that this form of motive means and speed control thereof is set forth by way of illustration and that I do not intend to be limited to this form for, as above pointed out, in so far as certain features of my invention are concerned, any other motive means of any suitable type or kind capable of having its speed controlled may be employed.

The alternator 11 is provided with an exciting field 17 energized by direct current, conveniently from the circuit 13—14. As the alternator 11 rotates in this direct current field, the frequency of the alternating current output of the alternator into the circuit 18—19 is a function of the speed of rotation of the alternator 11 and hence of the driving or driven member 10 and hence of the motive means 12.

The carbon pile 16 has its pressure controlled by any suitable means illustratively taking the form of a bell crank lever 20 pivoted at 21 and having one arm bearing against the unanchored end of the carbon pile 16; its other arm has related to it a spring 22 acting in a direction to tend to increase the pressure on the pile 16 and opposing the spring is an electro-responsive control means illustratively taking the form of a solenoid having a winding 23 and a movable core 24, the latter being connected to the lever 20.

The electro-responsive means is constructed in any suitable way so that for a given energization thereof, the lever 20 is held in whatever position it happens to be moved throughout its range of movement; where this means takes the form of a solenoid, therefore, the solenoid is correspondingly constructed and for this purpose the end of the core 24 may be tapered, as indicated in Figure 1, and may coact with a fixed member 25, also of magnetic material just as is the core 24, the member 25 being provided with a tapered portion, as indicated in Figure 1, for coaction with the tapered portion of the core 24. With such a construction, so long as the winding 23 is energized by a given value of uni-directional current, the core 24 and its connected parts are held by the magnetic effect of the winding 23 and fixed core 25 in whatever position these parts happen to be in throughout their range of movement.

The winding 23 is arranged to be energized by energy derived from the alternator 11. Where the alternator 11 forms part of a generating system of relatively small capacity, the voltage of its output is usually 110 volts or 220 volts and the frequency usually 60 cycles per second. To meet these and other conditions met with in practice, I provide a transformer 26 having primary and secondary windings 27—28, winding 28 being proportioned to have an output voltage suitable for coaction with the winding 23 and intervening apparatus (to be more clearly described hereinafter) while winding 27 may be designed for either 110 volts or 220 volts or whatever is the voltage of the alternator 11.

Conductors 29 and 30 connect the transformer winding 28 to a winding 31 of a transformer 32 provided with a winding 33 arranged in circuit with the regulating winding 23 above-mentioned and with a rectifier 34, the winding 33 being proportioned with respect to the winding 31 so that the former provides a voltage appropriate to achieve intended or desired energization of the winding 23 with the rectifier 34. The rectifier 34 may be of any suitable type or construction and preferably it is related to the transformer winding 33 and the regulating winding 23 so as to achieve double wave rectification.

Illustratively, the rectifier 34 may be of the thermionic type provided with a cathode 35 adapted to be heated from any suitable source of electrical energy (not shown) and coacting with the cathode 35 are two anodes 36 and 37. A conductor 38 connects anode 37 to one terminus of the transformer winding 33 and a conductor 39 connects the anode 36 to the other terminus of winding 33. The cathode 35 is connected by conductor 40 to one end of the winding 23 and the other end of the winding 23 is connected by conductor 41 to the midpoint 42 of winding 33, the latter thus being subdivided into two half windings or sections 33ᵃ and 33ᵇ.

By such an arrangement the regulating winding 23 is energized by uni-directional current derived by rectification of both half waves of the alternating current output of the alternator 11, and thus the desired regulating action of the solenoid may be achieved inasmuch as the serious and detrimental effects of change in impedance of the winding 23, were the latter to be energized by alternating current, are avoided, such change in impedance resulting from the change in relative positions of the magnetic members 24 and 25 as from change in position of core 24 relative to winding 23.

The rectifying action of the rectifier 34 is such that successive half waves of the alternating current are sent through the regulating winding 23 always in the same direction; thus during one half cycle, the half wave of current flows from one terminal of winding 33ᵇ, through conductor 41, winding 23, conductor 40, cathode 35, anode 36, and thence by way of conductor 39 to the other terminal of winding 33ᵇ; during this half wave, current output from the winding section 33ᵃ is suppressed by the uni-directionally conductive path between cathode 35 and anode 37.

During the succeeding half wave which is, of course, of opposed polarity, a current flow from winding section 33ᵇ is suppressed due to the valve action between cathode 35 and anode 36 while a current output from winding section 33ᵃ passes through conductor 41, regulating winding 23, conductor 40, cathode 35, anode 37, and thence by way of conductor 38 back to the other terminal of winding section 33ᵃ.

During these successive half waves, it will thus be seen that the current flows through the regulating winding 23 always in the same direction.

Interposed in the circuit between the transformers 26 and 32 is an inductance 43, preferably variable, made up of a suitable core 44 and a winding 45, the latter being interposed in conductor 29 leading from transformer winding 28 to transformer winding 31; core 44 is preferably made of two core parts 44ᵃ and 44ᵇ, relatively movable in any suitable way whereby the air gaps 44ᶜ and 44ᵈ may be varied. Connected in parallel with the inductance 43 is a suitable condenser 46, the parallel relation being achieved by conductors 47 and 48. Inductance 43 and condenser 46 are proportioned or adjusted to form a parallel circuit resonant at a frequency somewhat in excess of the frequency which is to be maintained constant, for example at a frequency slightly in excess of 60 cycles per second assuming that the alternator 11 is a 60-cycle alternator. At frequencies above 60 cycles and up to the resonant frequency, the impedance of the parallel circuit 45—46 rapidly increases but as the frequency diminishes in a direction below 60 cycles, the impedance of this parallel circuit very rapidly decreases. Inasmuch as this parallel circuit is in the path of current flow between the alternator 11 and the transformer 32, there is thus provided an impedance variable with changes in frequency but at a rate in excess of the first power of the frequency, with corresponding greatly amplified effects upon the magnitude of the current and hence of the energy supplied to the regulating winding 23. The winding 23 with the parts actuated thereby is so proportioned with respect to the parallel resonant circuit that, as long as the frequency of the alternating current output of the alternator 11 is of the desired value, illustratively 60 cycles per second, the winding 23 is energized by a current of a value sufficient to hold the core 24 in whatever position it happens to be, the pull of the winding 23 being thus in equilibrium with the spring 22 and any other opposition.

As soon, however, as the speed of rotation of the member 10 and hence of the alternator 11 exceeds the critical or desired frequency of 60 cycles, the impedance of the parallel circuit 45—46 rapidly increases inasmuch as the condition of resonance and maximum impedance is thus approached, and thus the current flow in the circuit 28—30 is quickly decreased with the result that the energization of winding 23 is at a correspondingly rapid rate also decreased. The above-mentioned state of equilibrium is thus disturbed and the pressure on the carbon pile 16 increased with resultant increase in the excitation of the motor field 15, the latter in turn resulting in diminishing the speed of the motor 12 and thus bringing the frequency of the output of the alternator 11 back to the normal or intended value when normal value of energizing current in the regulating winding 23 and mechanical equilibrium are again reestablished.

Should the speed of the motive means 12 or of the member 10 and hence the frequency of alternator 11 diminish, a substantially reverse action takes place in that the impedance of the parallel circuit 45—46 rapidly decreases as the frequency departs in a downward direction from the critical value. Thereby the uni-directional energization of regulating winding 23 is quickly increased, thus disturbing this mechanical equilibrium, whereupon the pull of the winding 23 exceeds spring 22, lessens the pressure on the carbon pile 16, and thus diminishing the excitation of the motor field 15, thus resulting in an increase in speed of the latter and hence of the shaft member 10 and of the alternator 11 and thus restoring the respective speed and frequency of the latter to normal.

Thus, a sensitive but dependable control of the speed or frequency may be achieved and material departures from intended values thereof quickly and accurately corrected; hence constancy of speed and frequency may be achieved.

In building and installing the control and regulating apparatus for a system like that of Figure 1, however, a number of distinct disadvantages occur. Reference to Figure 1 will show that two transformers are necessary as well as an inductance and a condenser if the voltage and current operating characteristics of the electronic conduction device 34 and of the inductive reactance 45 and the capacity reactance 46 are to be appropriately suited to or related to the voltage of the alternator 11, the latter being in practice usually 110 volts or 220 volts. These and other disadvantages I successfully eliminate and achieve low first cost as well as lower cost of installation by certain other features of my invention diagrammatically or schematically shown in Figure 2 in which certain of the parts above described in connection with Figure 1 and similarly designated are reproduced. Instead, however, of necessitating the use of three separate inductive reactance devices like the transformers 26 and 32 and the inductance 43 of Figure 1, I am enabled, in accordance with these other features of my invention, to utilize a single inductive reactance device and thereby achieve all of the functional and operating advantages of the system of Figure 1 and in fact greatly to improve thereover.

Turning now again to Figure 2, there is again shown the regulating or controlling winding 23 related to the electronic conduction device 34 and to a transformer winding 33 sub-divided into sections 33ᵃ and 33ᵇ, these parts being interconnected and functioning exactly as was described above in connection with Figure 1. As will later be pointed out, the operating voltages of the winding sections 33ᵃ and 33ᵇ are, as was the case in Figure 1, suited to the voltage and current characteristics of the device 34 and the winding 23. These winding sections 33ᵃ and 33ᵇ are related to a suitable iron core 50, preferably of the shell type, and, like the cores of the inductive devices of Figure 1, made of any suitable transformer iron, preferably laminated.

To the right of the right-hand leg of the core 50 is mounted a core member 51 preferably also of a suitable transformer iron and preferably laminated, and preferably the core 51, U-shaped as shown in Figure 2, is mounted in any suitable manner so that the air gaps 52 and 53 between the cores 50 and 51 may be varied at will.

For this purpose any suitable mounting and adjusting arrangement may be adopted and by way of illustration, the core 51 is provided with a bracket 54 through which is threaded the shank of an adjusting screw 55 whose inner or left-hand end, as viewed in Figure 2, is anchored in a suitable fixed bracket 56 so that the screw 55 may be rotated relative to the bracket 56 but held with respect to the latter against movement in an axial direction. If, therefore, the adjusting screw 55 is operated, the core 51 is moved toward or away from the core 50 and thus the air gaps 52 and 53 diminished or increased.

The core members 50 and 51, as well as the electronic conduction device 34 may be and preferably are compactly mounted or supported on any suitable base or panel, the latter being diagrammatically indicated at 57 and preferably also carried by the panel 57 is a condenser 58, the latter being of any suitable construction and being supported by the panel 57 in any suitable way.

Condenser 58 is connected by conductors 59 and 60 to a winding 61 about the core 51, forming a closed circuit in which the inductive reactance of the winding 61 and the capacity reactance of the condenser 58 are in parallel.

About the right-hand leg of the core 50 is a winding 62 sub-divided into two halves 62ᵃ and 62ᵇ, the latter being provided with terminals 63, 64, 65 and 66. In order to meet the conditions of ordinary or usual commercial voltages, the winding sections 62ᵃ and 62ᵇ are constructed and designed, with respect to the remaining parts of the inductive device, individually to operate at 110 volts; hence, if these windings are connected in series and thus serially connected are bridged, as by conductors 67 and 68 across the circuit 18—19 of the alternator 11, the apparatus is suitable for operation at a primary or input voltage of 220 volts where that is the voltage of the alternator 11. If, however, the voltage of the latter is 110, the binding posts or terminals are available for connecting the primary winding sections 62ᵃ and 62ᵇ in parallel and the apparatus is thus appropriate for operation in a 110-volt circuit where that is the voltage of the alternator 11.

In any case, the primary winding 62, energized by current from the alternator 11, provides a flux, a substantial portion of which circulates through the core 50, thus linking the winding sections 33ᵃ and 33ᵇ to the primary winding 62 and resulting, as above pointed out, suitable voltages in the winding sections 33ᵃ and 33ᵇ to meet the operating characteristics of the regulating winding 23 and the device 34. However, a portion of the flux produced in the right-hand leg of the core 50 by the primary winding 62 circulates through the core 51, the latter in effect forming a magnetic shunt about a portion of the core 50.

This leakage flux, thus shunted by the core 51, magnetically links the winding 61 with the primary transformer winding 62 and the resultant E. M. F. is available for action in the parallel circuit 61—58, the latter being resonant at a frequency somewhat above the frequency which is to be maintained constant across the terminals of the alternator 11. This resonant circuit, however, is magnetically coupled to the regulating or control circuits through the leakage flux abovementioned but, as an analysis of the arrangement of Figure 2 will show, this coupling is of such a character that the so-called resonant circuit is available for modifying the current supplied to the regulating winding 23 in response to changes in frequency.

For example, if the speed of the rotating member 10 or the frequency of the alternator 11 increases, the circulating current in the parallel circuit 61—58 rapidly increases as the resonant frequency is approached, the condenser 58 supplying more and more of the magnetizing current for the shunt winding 61, and the resultant transformer action between the magnetic circuit (with air gaps) linking the windings 62 and 61 causes a correspondingly rapid decrease in the energizing current in the transformer primary winding 62 with a corresponding rapid decrease in the flux circulating in the core 50, thus decreasing the voltages induced in the winding sections 33a and 33b and with corresponding rapidity decreasing the energization of regulating winding 23, the latter, as will now be clear in view of what has been said in connection with Figure 1, operating on the speed control of the motive means 12 to quickly restore the speed of the latter and hence the frequency of the alternator 11 to its normal or intended value.

A reverse action takes place when the speed or frequency tends to drop below the intended value thereof. Thus, a drop in the frequency of the alternating current energizing the winding 62 results in such a rapid decrease in the impedance represented by the parallel circuit 61—58 that the energizing current in transformer primary winding 62 rapidly increases, the flux produced thereby and circulated through the magnetic circuits is correspondingly increased and likewise the voltages of the winding sections 33a and 33b and hence also the energization of regulating winding 23 increased, the latter thus bringing about such an action of the speed control of the motive means 12 that the speed thereof and hence the frequency of the alternator 11 is quickly restored.

Thus, the system and apparatus of Figure 2 will be seen to have many important and marked advantages. But additionally, it has the important advantage of making it possible quickly and easily to set it to maintain any other frequency, within its range of operation, constant. For example, the usual commercial frequency is 60 cycles per second but frequencies of 40 and 25 are also widely used commercially. Moreover, depending upon the type of speed or frequency control desired, other than these frequency values may, according to circumstances, be desired to be maintained constant. With the system of Figure 2, the resonant frequency, with respect to which, as above pointed out, the apparatus and system operates, may be readily altered or shifted; this is accomplished by changing the position of the core 51 and hence by changing the width of the air gaps 52—53. Such action changes the magnetizing force necessary for the leakage flux that links the winding 61 on the core 51 and correspondingly changes the value of impedance of the parallel circuit combination made up of the inductive winding 61 and its magnetic circuit, and the condenser 58, the capacity of which may remain unaltered. By thus changing the relation between the inductive or leakage reactance and the capacity reactance of the parallel circuit, the frequency of resonance is shifted and correspondingly the value at which the frequency of the alternator 11 is maintained constant also changed. Thus, the system of Figure 2 will be seen to be of wide flexibility and ease of control with respect to change in standard of frequency or speed regulation that may be desired.

It will thus be seen that there has been provided in this invention a system and apparatus in which the various objects hereinbefore set forth, together with many thoroughly practical advantages are successfully achieved. It will be seen that the apparatus and system are of thoroughly dependable and reliable action and capable of wide application in practical use where speed or frequency regulation may be desired.

As many possible embodiments may be made of the above invention and as many changes might be made in the embodiment above set forth, it is to be understood that all matter hereinbefore set forth or shown in the accompanying drawing, is to be interpreted as illustrative and not in a limiting sense.

I claim:—

1. In a system of the character described, in combination, an alternator, means for controlling the speed of rotation of said alternator, electromagnetic means for controlling said speed-controlling means, said electromagnetic means comprising a winding and a movable magnetic member and having the characteristic that change in position of said magnetic member relative to the winding changes the impedance thereof if the winding is energized by alternating current, a rectifying device, means including inductive reactance means for connecting said winding and said rectifying device to the circuit of said alternator whereby said winding is energized by unidirectional current and the aforesaid change in impedance prevented from affecting the action of said winding, and means for causing the effective energization of said winding to vary with changes in frequency of said alternator and comprising a winding and a condenser connected in circuit with one another and a core for said last-mentioned winding magnetically coupled to said inductive reactance means, said last-mentioned winding and said condenser having respectively inductive and capacity reactances to form a circuit resonant at a frequency adjacent the frequency desired to be maintained across the terminals of the alternator, whereby the energization of said winding, when a change in frequency occurs, is altered in a direction to cause said electromagnetic means to operate said speed-controlling means in a direction to restore the desired frequency, and means for varying the standard of frequency to be maintained constant comprising means for varying the magnetic coupling between said last-mentioned winding and said inductive reactance means.

2. In a system of the character described, in combination, an alternator, means for controlling the speed of rotation of said alternator, electromagnetic means for controlling said speed-controlling means, said electromagnetic means comprising a winding and a movable magnetic member and having the characteristic that change in position of said magnetic member relative to the winding changes the impedance thereof if the winding is energized by alternating current, a unilaterally conductive electronic conduction device, a transformer having a core and primary and secondary windings, the primary winding being electrically connected across said alternator and the secondary winding being connected in circuit with said first-mentioned winding and said conductive device whereby said winding is energized by unidirectional current and the aforesaid change in impedance prevented from affecting the action of said winding, and means for causing the effective energization of said winding to vary with changes in frequency of said alternator in a direction to make said winding effective upon said speed-controlling means in a direction to restore the frequency to be maintained constant, said means comprising a winding and a condenser connected in circuit with one another and a core for said last-mentioned winding, said last-mentioned core being magnetically related to the core of said transformer whereby the circuit of said last-mentioned winding and condenser is magnetically coupled to the circuit of said alternator and said first-mentioned winding.

3. In a system of the character described, in combination, an alternator, means for controlling the speed of rotation of said alternator, electromagnetic means for controlling said speed-controlling means, said electromagnetic means comprising a winding and a movable magnetic member and having the characteristic that change in position of said magnetic member relative to the winding changes the impedance thereof if the winding is energized by alternating current, a unilaterally conductive electronic conduction device, a transformer having a core and primary and secondary windings, the primary winding being electrically connected across said alternator and the secondary winding being connected in circuit with said first-mentioned winding and said conductive device whereby said winding is energized by unidirectional current and the aforesaid change in impedance prevented from affecting the action of said winding, and means for causing the effective energization of said winding to vary with changes in frequency of said alternator in a direction to make said winding effective upon said speed-controlling means in a direction to restore the frequency to be maintained constant, said means comprising a winding and a condenser connected in circuit with one another and a core for said last-mentioned winding, said core being magnetically related to the core of said transformed whereby the circuit of said last-mentioned winding and condenser is magnetically coupled to the circuit of said alternator and said first-mentioned winding, and means for changing the standard of operation of said speed-controlling means comprising means for changing the magnetic interrelation between said two cores.

4. In a system of the character described, in combination, an alternator, means for controlling the speed of rotation of said alternator, electromagnetic means for controlling said speed-controlling means, said electromagnetic means comprising a winding and a movable magnetic member and having the characteristic that change in position of said magnetic member relative to the winding changes the impedance thereof if the winding is energized by alternating current, a unilaterally conductive electronic conduction device, a transformer having a core and primary and secondary windings, the primary winding being electrically connected across said alternator and the secondary winding being connected in circuit with said first-mentioned winding and said conductive device whereby said winding is energized by unidirectional current and the aforesaid change in impedance prevented from affecting the action of said winding, and means for causing the effective energization of said winding to vary with changes in frequency of said alternator in a direction to make said winding effective upon said speed-controlling means in a direction to restore the frequency to be maintained constant, said means comprising a winding and a condenser connected in circuit with one another and a core for said last-mentioned winding, said core being magnetically related to the core of said transformer whereby the circuit of said last-mentioned winding and condenser is magnetically coupled to the circuit of said alternator and said first-mentioned winding, and means for changing the standard of operation of said speed-controlling means comprising means for changing the effective flux-linkage between said last-mentioned winding and the primary winding of said transformer.

5. In a system of the character described, in combination, an alternator, means for controlling the speed of rotation of said alternator, electromagnetic means for controlling said speed-controlling means, said electromagetic means comprising a winding and a movable magetic member and having the characteristic that change in position of said magnetic member relative to the winding changes the impedance thereof if the winding is energized by alternating current, a unilaterally conductive electronic conduction device, a transformer having a core and primary and secondary windings, the primary winding being electrically connected across said alternator and the secondary winding being connected in circuit with said first-mentioned winding and said conductive device whereby said winding is energized by unidirectional current and the aforesaid change in impedance prevented from affecting the action of said winding, and means for causing the effective energization of said winding to vary with changes in frequency of said alternator in a direction to make said winding effective upon said speed-controlling means in a direction to restore the frequency to be maintained constant, said means comprising a winding and a condenser connected in circuit with one another and a core for said last-mentioned winding, said core being magnetically related to the core of said transformer whereby the circuit of said last-mentioned winding and condenser is magnetically coupled to the circuit of said alternator and said first-mentioned winding, and means for changing the standard of operation of said speed-controlling means comprising means for varying at will the position of one of said cores relative to the other.

6. In a system of the character described, in combination, an alternator, means for controlling the speed of rotation of said alternator, electromagnetic means for controlling said speed-controlling means, said electromagnetic means comprising a winding and a movable magnetic member and having the charactertisic that change in position of said magnetic member relative to the winding changes the impedance thereof if the winding is energized by alternating current, a unilaterally conductive electronic conduction device, a transformer having a core and primary and secondary windings, the primary winding being electrically connected across said alternator and the secondary winding being connected in circuit with said first-mentioned winding and said conductive device whereby said winding is energized by unidirectional current and the aforesaid change in impedance prevented from affecting the action of said winding, and means for causing the effective energization of said winding to vary with changes in frequency of said alternator in a direction to make said winding effective upon said speed-controlling means in a direction to restore the frequency to be maintained constant, said last-mentioned means comprising frequency-responsive impedance means and means relating said impedance means to be responsive to flux derived from the primary winding of said transformer.

7. In a system of the character described, in combination, an alternator, means for controlling the speed of rotation of said alternator, electromagnetic means for controlling said speed-controlling means, said electromagnetic means comprising a winding and a movable magnetic member and having the characteristic that change in position of said magnetic member relative to the winding changes the impedance thereof if the winding is energized by alternating current, a unilaterally conductive electronic conduction device, a transformer having a core and primary and secondary windings, the primary winding being electrically connected across said alternator and the secondary winding being connected in circuit with said first-mentioned winding and said conductive device whereby said winding is energized by unidirectional current and the aforesaid change in impedance prevented from affecting the action of said winding, and means for causing the effective energization of said winding to vary with changes in frequency of said alternator in a direction to make said winding effective upon said speed-controlling means in a direction to restore the frequency to be maintained constant, said means comprising a core positioned in shunt relation to the core of said transformer and reactance means responsive to flux in said second-mentioned core.

8. In a system of the character described, in combination, an alternator, means for controlling the speed of rotation of said alternator, electromagnetic means for controlling said speed-controlling means, said electromagnetic means comprising a winding and a movable magnetic member and having the characteristic that change in position of said magnetic member relative to the winding changes the impedance thereof if the winding is energized by alternating current, unilaterally conductive electronic conduction device, a transformer having a core and primary and secondary windings, the primary winding being electrically connected across said alternator and the secondary winding being connected in circuit with said first-mentioned winding and said conduction device whereby said winding is energized by unidirectional current and the aforesaid change in impedance prevented from affecting the action of said winding, and means for causing the effective energization of said winding to vary with changes in frequency of said alternator in a direction to make said winding effective upon said speed-controlling means in a direction to restore the frequency to be maintained constant, said last-mentioned means comprising a core positioned in shunt relation to the core of said transformer but with an air gap therebetween and reactance means responsive to the flux in said shunt core and means for changing the air gap.

9. In a system of the character described, in combination, an alternator, means for controlling the speed of rotation of said alternator, electromagnetic means for controlling said speed-controlling means, said electromagnetic means comprising a winding and a movable magnetic member and having the characteristic that change in position of said magnetic member relative to the winding changes the impedance thereof if the winding is energized by alternating current, a transformer having a core and a primary winding and a secondary winding thereon, means connecting the primary winding to be responsive to a function of the output of said alternator, means including a unilaterally conductive device for energizing said first-mentioned winding from said secondary winding at a current value corresponding to the critical frequency of said alternator, and impedance means variable with frequency flux-linked to said transformer core for changing the energization of said first-mentioned winding in a direction away from said current value and in a direction to cause said speed-controlling means to be actuated by said electromagnetic means to substantially restore said current value.

10. In a system of the character described, in combination, an alternator, means for controlling the speed of rotation of said alternator, electromagnetic means for controlling said speed-controlling means, said electromagnetic means comprising a winding and a movable magnetic member and having the characteristic that change in position of said magnetic member relative to the winding changes the impedance thereof if the winding is energized by alternating current, means comprising an electric circuit for energizing said winding with unidirectional current derived from said alternator at a given current value corresponding to a given frequency of output of said alternator, said circuit having therein inductive means, and impedance means variable with change in frequency coupled to said inductance means for altering the energization of said winding in a direction to cause said speed-controlling means to be effective to restore the frequency of said alternator to said given frequency.

11. In a system of the character described, in combination, an alternator, means for controlling the speed of rotation of said alternator, electromagnetic means for controlling said speed-controlling means, said electromagnetic means comprising a winding and a movable magnetic member and having the characteristic that change in position of said magnetic member relative to the winding changes the impedance thereof if the winding is energized by alternating current, means comprising an electric circuit for energizing said winding with unidirectional current derived from said alternator at a given current value corresponding to a given frequency of output of said alternator, means forming a resonant circuit having the characteristic of change in impedance with change in frequency, and means coupling said resonant circuit to said first-mentioned circuit whereby the effective impedance of said first-mentioned circuit changes with change in frequency.

12. In a system of the character described, in combination, a rotating member whose speed is to be controlled, electro-responsive means for controlling the speed of rotation thereof, means producing a varying E. M. F. whose frequency is a function of the speed of rotation of said member, reactance coupling means, means energizing said electro-responsive means through said reactance means at a certain current value corresponding to the speed at which said rotating member is to rotate, and means for varying the energization of said electro-responsive means with change in frequency comprising a separate and isolated resonant circuit inductively coupled to said reactance means, said resonant circuit having the characteristic of change in impedance with change in frequency of the current energizing said resonant circuit.

13. In a system of the character described, in combination, a rotating member whose speed is to be controlled, electro-responsive means for controlling the speed of rotation thereof, means producing a varying E. M. F. whose frequency is a function of the speed of rotation of said member, reactance coupling means, means energizing said electro-responsive means through said reactance means at a certain current value corresponding to the speed at which said rotating member is to rotate, a core magnetically related to said reactance means, a winding about said core, and means electrically related to said last-mentioned winding for causing the effect thereof to vary at a rate greater than the first power of the frequency of the E. M. F. induced in said last-mentioned winding.

14. In a system of the character described, in combination, a rotating member whose speed is to be controlled, electro-responsive means for controlling the speed of rotation thereof, means producing a varying E. M. F. whose frequency is a function of the speed of rotation of said member, reactance coupling means, means energizing said electro-responsive means through said reactance means at a certain current value corresponding to the speed at which said rotating member is to rotate, a core magnetically related to said reactance means, a winding about said core, and means for closing the circuit of said last-mentioned winding comprising a capacity reactance.

15. In a system of the character described, in combination, a rotating member whose speed is to be controlled, electro-responsive means for controlling the speed of rotation thereof, means producing a varying E. M. F. whose frequency is a function of the speed of rotation of said member, a circuit for said electro-responsive means, said circuit deriving its energy from said E. M. F.-producing means and having therein coupled inductive reactances, the circuit of one of said inductive reactances being completed by means which cause its effect to vary at a rate greater than the first power of the frequency of said E. M. F., whereby the energization of said electro-responsive means is varied in response to changes in said frequency and in a direction to negative changes in speed of said rotating member.

16. In a system of the character described, in combination, a rotating member whose speed is to be controlled, electro-responsive means operating in response to variation in energization to maintain substantially constant the speed of rotation thereof, means producing a varying E. M. F. whose frequency is a function of the speed of rotation of said member, and means for causing said electro-responsive means to respond to, and its energization to vary with, changes in frequency of said E. M. F. but at a rate greater than the first power of the frequency, said last-mentioned means comprising a transformer for coupling said electro-responsive means to said E. M. F.-producing means and a resonant circuit comprising a capacity reactance and an inductive reactance and means for inductively coupling said inductive reactance to said transformer.

17. In a system of the character described, in combination, a rotating member whose speed is to be controlled, electro-responsive means operating in response to variation in energization to maintain substantially constant the speed of rotation thereof, means producing a varying E. M. F. whose frequency is a function of the speed of rotation of said member, and means for causing said electro-responsive means to respond to, and its energization to vary with, changes in frequency of said E. M. F. but at a rate greater than the first power of the frequency, said last-mentioned means comprising a transformer for coupling said electro-responsive means to said E. M. F.-producing means and means for affecting the flux-linkage of said transformer at a rate greater than the first power of the frequency.

18. In a system of the character described, in combination, a rotating member whose speed is to be controlled, electro-responsive means operating in response to variation in energization to maintain substantially constant the speed of rotation thereof, means producing a varying E. M. F. whose frequency is a function of the speed of rotation of said member, and means for causing said electro-responsive means to respond to, and its energization to vary with, changes in frequency of said E. M. F. but at a rate greater than the first power of the frequency, said last-mentioned means comprising a transformer for coupling said electro-responsive means to said E. M. F.-producing means and means forming a magnetic shunt adapted to affect the flux linkage between the windings of said transformer and means having a winding about said magnetic shunt for reacting upon said flux linkage.

19. In a system of the character described in combination, a rotating member whose speed is to be controlled, electro-responsive means operating in response to variation in energization to maintaining substantially constant the speed of rotation thereof, means producing a varying E. M. F. whose frequency is a function of the speed of rotation of said member, means comprising a transformer and a device energized from a winding of said transformer for energizing said electro-responsive means with unidirectional current, frequency-responsive impedance means having the characteristic of changing its impedance disproportionately with changes in frequency, and means free from conductive interconnection therewith for relating said impedance means to affect the energization of said electro-responsive means.

20. In a system of the character described, in combination, a rotating member whose speed is to be controlled, electro-responsive means operating in response to variation in energization to maintain substantially constant the speed of rotation thereof, means producing a varying E. M. F. whose frequency is a function of the speed of rotation of said member, and means causing said electro-responsive means to respond to changes in said frequency, said last-mentioned means comprising two coupled reactance means, one of which has a closed and isolated electric circuit and has the characteristic that its impedance changes disproportionately with changes in frequency and the other of which is in circuit with said first-mentioned means, and means for varying the coupling between said two reactance means for thereby changing the effect of said characteristic of said isolated electric circuit upon said electro-responsive means and for thereby changing the standard of operation of the latter without having to alter the constants per se of said isolated circuit.

21. In a system of the character described, in combination, a prime mover and means for controlling a function of the output of said prime mover, said means comprising an alternator driven thereby and means for affecting the power output of said prime mover, electro-responsive means operating in response to changes in energization thereof for controlling said last-mentioned means, a transformer for energizing said electro-responsive means from said alternator, an isolated and closed circuit having a resonant characteristic and energized by said alternator and coupled to affect the energization of said electro-responsive means.

LOUIS H. VON OHLSEN.